United States Patent
Peng et al.

(10) Patent No.: US 11,173,443 B2
(45) Date of Patent: Nov. 16, 2021

(54) REDUCING FLUCTUATIONS IN TAIL GAS FLOW AND FUEL PROPERTY FROM AN ADSORPTION UNIT

(71) Applicant: Air Products and Chemicals, Inc., Allentown, PA (US)

(72) Inventors: Xiang-Dong Peng, Orefield, PA (US); Elizabeth M. D'Addio, Fogelsville, PA (US); Jeffrey Raymond Hufton, Fogelsville, PA (US); Yu Zhang, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 329 days.

(21) Appl. No.: 16/546,460

(22) Filed: Aug. 21, 2019

(65) Prior Publication Data

US 2021/0053009 A1 Feb. 25, 2021

(51) Int. Cl.
*C01B 3/56* (2006.01)
*B01D 53/047* (2006.01)
*B01D 53/04* (2006.01)

(52) U.S. Cl.
CPC ....... *B01D 53/0446* (2013.01); *B01D 53/047* (2013.01); *C01B 3/56* (2013.01); *B01D 2256/16* (2013.01); *B01D 2259/40028* (2013.01); *B01D 2259/40035* (2013.01); *B01D 2259/40052* (2013.01); *B01D 2259/41* (2013.01); *C01B 2203/043* (2013.01)

(58) Field of Classification Search
CPC ........................... B01D 53/047; B01D 53/053; B01D 53/0446; B01D 2256/16; B01D 2259/40052; B01D 2259/40009; B01D 2259/4002; B01D 2259/40028; B01D 2259/40035; B01D 2259/40043; B01D 2259/40064; B01D 2259/40079; B01D 2259/40081; B01D 2259/4062; B01D 2259/4065; B01D 2259/4067; C01B 3/56; C01B 2203/0233; C01B 2203/043; C01B 2203/047; C01B 2203/0475; C01B 2203/048; C01B 2203/0827
USPC .................................................. 95/96–98, 103
See application file for complete search history.

(56) References Cited

U.S. PATENT DOCUMENTS

| 9,381,460 B2 | 7/2016 | Weist, Jr. et al. |
| 2006/0130651 A1 | 6/2006 | Bizjak |
| 2013/0239807 A1* | 9/2013 | Weist, Jr. ............. B01D 53/047 95/100 |

(Continued)

FOREIGN PATENT DOCUMENTS

EP 2823872 A2 1/2015

OTHER PUBLICATIONS

Anonymously Disclosed, Pressure Swing Adsorption Cycles for 4 to 7 Adsorption Beds, Apr. 29, 2015, 24 pgs.; IP.com.

(Continued)

*Primary Examiner* — Frank M Lawrence, Jr.
(74) *Attorney, Agent, or Firm* — Jason M. Ploeger

(57) ABSTRACT

Pressure swing adsorption process for reducing fluctuations in the flow rate of tail gas from the adsorption unit and reducing fluctuations in the stoichiometric oxidant flow rate required to completely combust the tail gas in a reformer furnace. Constant flow rate and constant fuel property can be obtained by intelligent mixing designs.

15 Claims, 9 Drawing Sheets

(56) References Cited

U.S. PATENT DOCUMENTS

| | | | | |
|---|---|---|---|---|
| 2013/0255492 | A1* | 10/2013 | Hsu | B01D 53/047 95/100 |
| 2014/0373713 | A1* | 12/2014 | Weist, Jr. | B01D 53/047 95/100 |
| 2016/0097013 | A1* | 4/2016 | Knaebel | B01D 53/047 95/102 |
| 2020/0368665 | A1* | 11/2020 | D'Addio | C01B 3/56 |

OTHER PUBLICATIONS

Anonymously Disclosed, Pressure Swing Adsorption Cycles for 7 or more Adsorption Beds, May 18, 2015, 67 pgs; IP.com.
D'Addio, Elizabeth M. et al. Reducing Fluctuations in Tail Gas Flow from an Adsorption Unit, U.S. Appl. No. 16/421,543, filed May 24, 2019, 30 pgs.

\* cited by examiner

REDUCING FLUCTUATIONS IN TAIL GAS FLOW AND FUEL PROPERTY FROM AN ADSORPTION UNIT

BACKGROUND

This disclosure relates to pressure swing adsorption (PSA) processes, and more particularly to reducing fluctuations of the flow rate of the tail gas from the adsorption unit and to reducing fluctuations of the instantaneous fuel value (i.e. heating value) of the tail gas or stoichiometric oxidant flow rate required to completely combust the tail gas in a reformer furnace.

PSA processes are well-known for the separation of gas mixtures that contain components with different adsorbing characteristics. The pressure swing adsorption process may be used for separating a primary gas component from a feed gas mixture comprising the primary gas component and one or more secondary gas components. The primary gas component may be $H_2$ and the secondary gas components may be gases such as $N_2$, CO, $CO_2$, and $CH_4$, such as a reformate from a steam methane reformer or other hydrocarbon reforming process. The primary gas component may be $H_2$ and the secondary gas components may be gases such as $CH_4$, $C_2H_6$, $C_3H_8$, and/or higher alkanes, alkenes, and aromatics associated with refinery off gas streams.

Hydrogen production via pressure swing adsorption ($H_2$ PSA) is an established industry practice for supplying high purity hydrogen for petroleum refiners, chemical producing industries, metals refining, and other related industries. The feed gas mixture may be a reformate from a steam-hydrocarbon reforming process or an autothermal reforming process. The reformate may have been shifted in a shift reactor. The feed gas mixture may be a properly treated effluent stream from a gasification unit.

In a typical PSA system, a multicomponent gas is passed to at least one of multiple adsorption beds at an elevated pressure to adsorb at least one strongly sorbed component while at least one component passes through the adsorption bed. In the case of a $H_2$ PSA, $H_2$ is the most weakly adsorbed component and passes through the adsorption bed.

Pressure swing adsorption cycles comprise a number of well-known steps. The various steps of pressure swing adsorption cycles are described in EP 2823872 and US2014/0373713 (now U.S. Pat. No. 9,381,460), incorporated herein by reference. Specific pressure swing adsorption cycles are provided in companion articles "Pressure Swing Adsorption cycles for 4 to 7 adsorption beds," IP.com number 000241449, Apr. 29, 2015, and "Pressure Swing Adsorption cycles for 7 or more adsorption beds," IP.com number 000241619, May 18, 2015, each available online and in the printed IP.com Journal, and each incorporated herein by reference.

The length of a step may be quantized (discretized) (i.e. an integer number of cycle time segments). However, the step may be a fractional value of a cycle time segment with the balance as an idle step. The cycle time of the PSA cycle is the length of time when the feed gas mixture is first introduced into a first bed in the repetitive cycle of steps to the time when the gaseous mixture is again first introduced into the same first bed in the next repetitive cycle of steps immediately following the previous repetitive cycle of steps.

As pressure swing adsorption (PSA) processes are well-known, one of ordinary skill in the art can construct an adsorption system suitable for carrying out the process described herein. Suitable equipment for carrying out the process can be readily selected. Operating conditions not specifically disclosed herein that are suitable for use in the process described herein are known and may be determined by one skilled in the art without undue experimentation.

The process according to the present disclosure may be carried out in axial adsorbent beds or radial adsorbent beds.

Pressure swing adsorption processes are carried out in a plurality of adsorption beds. Generally, more than one adsorption bed are used so that at least one adsorption bed can be producing product gas while another bed is regenerating. In this way, product gas can be produced on a continuous basis. Any suitable number of adsorption beds may be used. In general, the PSA process is designed to meet required product purity and $H_2$ product recovery and the number of adsorption beds selected accordingly. The skilled person can readily select the number of adsorption beds to use.

The adsorption beds may contain a single adsorbent or multiple adsorbents. In the case of multiple adsorbents, the adsorbents may be interspersed, layered, or a combination thereof. Suitable adsorbents are known and may be readily selected by those skilled in the art. Activated alumina, silica gel, activated carbon, molecular sieves, and naturally occurring zeolites are common.

FIG. 1 shows a schematic of an example adsorption system with adsorption beds 10A, 20A, 30A, 40A, 50A, 10B, 20B, 30B, 40B, and 50B, suitable for a PSA process. An adsorption system may be constructed with pairs, or other multiples of beds, operating in parallel (i.e. on the same step). For example, adsorption beds 10A and 10B could be configured to always be on the same step, adsorption beds 20A and 20B on the same step, etc. Alternatively, an adsorption system may be constructed without beds operating in parallel.

An adsorption bed is a grouping of adsorption material which undergoes each of the cycle steps contemporaneously. An adsorption bed may be contained in a single containment vessel or contained within multiple containment vessels.

The adsorption beds in the adsorption unit undergo a repetitive cycle of steps, some where the feed gas mixture is introduced into one or more of the adsorption beds, some where product gas is withdrawn from one or more of the adsorption beds, some where intermediate gas streams are passed between adsorption beds, and some where tail gas (by-product gas) is withdrawn from one or more of the adsorption beds.

In catalytic steam-hydrocarbon reforming, the by-product gas contains combustible gas components that have fuel value. Catalytic steam-hydrocarbon reforming is an energy intensive process. The by-product gas is passed to burners in the reformer furnace along with a supplemental (trim) fuel to provide energy for the reforming process.

However, since the pressure swing adsorption process is a cyclic process (requiring pressure swings), the flow rate, pressure, and component concentrations of by-product gas varies during the cycle.

Industry desires to minimize pressure and flow rate fluctuations of the fuel to the reformer furnace. Industry desires to operate the reformer furnace at steady temperatures optimized for furnace efficiency without exceeding temperature limits required for reformer tubes and other components to survive the furnace campaign.

In an effort to dampen pressure and flow rate fluctuations of the by-product gas passed to the burner in the reformer furnace, a surge vessel 60 is used as shown in FIG. 1. Greater dampening of pressure and flow rate fluctuations is provided with larger surge vessels.

Due to the capital cost of the surge vessel, industry desires to reduce the size of the surge vessel needed to dampen flow rate variation of the by-product gas (tail gas) stream from the adsorption unit to the burners.

The flow rate of the by-product gas from the surge vessel 60 to the burners is regulated using one or more valves downstream of the surge vessel. A small and large valve in parallel (not shown) can be used to regulate the flow of the by-product gas to the burners where the valve position of the large valve is set (for coarse control) so that the valve position of the small valve can provide flow regulation in the middle of its operating range (for fine control).

The valves between the surge vessel and the burners require a certain amount of back pressure in the surge vessel. The pressure in the surge vessel limits the final blowdown pressure and purge gas effluent pressure for the pressure swing adsorption unit.

Industry desires to operate the pressure swing adsorption unit with lower final blowdown pressures and purge pressures because lower pressures can result in efficiency and/or yield improvements for the pressure swing adsorption unit.

The flow rate of oxidant (e.g. air) for combustion of the by-product gas and trim fuel is set to provide complete combustion of the by-product gas and trim fuel and to limit NOx formation. The target flow rate of oxidant is set considering the full range of expected flow rates and combustible gas concentrations of the by-product gas. The surge vessel 60 can, to some extent, dampen some variation in the combustible gas concentrations of the by-product gas. The excess air leaving the furnace can be measured and the combustion oxidant introduced into the furnace adjusted accordingly to provide a desired amount of excess oxygen.

Industry desires to minimize the excess oxidant (air) that is required because reduced excess oxidant (air) improves furnace efficiency.

BRIEF SUMMARY

The present invention relates to a process for producing a product gas and a by-product gas from a feed gas mixture in an adsorption separation unit comprising a plurality of adsorption beds, the feed gas mixture comprising a primary gas component and secondary gas components, each adsorption bed containing an adsorbent selective for the secondary gas components, the product gas enriched with the primary gas component, the by-product gas depleted of the primary gas component, where each of the plurality of adsorption beds is subjected to a repetitive cycle of steps.

There are several aspects of the invention as outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process comprising a production step (110), which comprises introducing a stream (101) of the feed gas mixture (100) into an adsorption bed undergoing the production step (110) and adsorbing the secondary gas components on the adsorbent in the adsorption bed undergoing the production step while simultaneously withdrawing a product gas stream (200) from the adsorption bed undergoing the production step (110);

a supply purge gas step (120), which comprises co-currently withdrawing a stream of purge gas (125) from an adsorption bed undergoing the supply purge gas step (120), and passing the stream of purge gas (125) from the adsorption bed undergoing the supply purge gas step to an adsorption bed undergoing a purge step (140);

a blowdown step (130), which comprises counter-currently withdrawing a stream of blowdown gas (135) from an adsorption bed undergoing the blowdown step (130);

the purge step (140), which comprises counter-currently introducing the stream of purge gas (125) from the adsorption bed undergoing the supply purge gas step (120) into an adsorption bed undergoing the purge step (140) (the stream of purge gas which is introduced having a flow rate) and counter-currently withdrawing a stream of purge gas effluent (145) from the adsorption bed undergoing the purge step (140);

a repressurization step (150), which comprises increasing the pressure in an adsorption bed undergoing the repressurization step (150) by at least one of (i) co-currently introducing a second stream (102) of the feed gas mixture (100) into the adsorption bed undergoing the repressurization step (150), or (ii) counter-currently introducing a portion of the product gas stream (200) from the adsorption bed undergoing the production step (110) into the adsorption bed undergoing the repressurization step (150);

wherein at least one adsorption bed undergoes at least part of the purge step (140) simultaneously with at least one other adsorption bed undergoing at least part of the blowdown step (130), and the stream of purge gas effluent (145) from the adsorption bed undergoing the purge step (140) is combined with the stream of blowdown gas (135) from the adsorption bed undergoing the blowdown step (130) to form a by-product gas (tail gas) stream (57);

introducing the by-product gas stream (57) into a surge vessel (60);

withdrawing the by-product gas stream (57) from the surge vessel (60);

regulating the flow rate of the stream of purge gas (125) from the adsorption bed undergoing the supply purge gas step (120) to target a first predefined time-dependent flow rate, f(t), of the purge gas effluent (145) from the adsorption bed undergoing the purge step (140); and regulating the flow rate of the stream of blowdown gas (135) from the adsorption bed undergoing the blowdown step (130) to target a second predefined time-dependent flow rate, g(t);

wherein the first predefined time-dependent flow rate, f(t), is calculated from a function relating a fuel property value for the purge gas effluent (145) to a cumulative flow of the purge gas effluent (145) (i.e. using a characteristic curve for the purge gas effluent);

wherein the second predefined time-dependent flow rate, g(t), is calculated from a function relating a fuel property value for the blowdown gas (135) to a cumulative flow of the blowdown gas (135) (i.e. using a characteristic curve for the blowdown gas); and wherein the first predefined time-dependent flow rate, f(t), and the second predefined time-dependent flow rate, g(t), are each calculated to provide a combined molar or volumetric flow rate that is constant or limited to a selected flow rate range.

Aspect 2. The process according to aspect 1, wherein the fuel property value, $\psi$, for the purge gas effluent (145) is determined, by simulation or measurement, as a function of the cumulative flow of the purge gas effluent (145) in the purge step (140).

Aspect 3. The process according to aspect 1 or aspect 2, wherein the fuel property value, $\phi$, for the blowdown gas (135) is determined, by simulation or measurement, as a function of the cumulative flow of the blowdown gas (135) in the blowdown step (130).

Aspect 4. The process according to any one of aspects 1 to 3, wherein the first predefined time-dependent flow rate, f(t), and the second predefined time-dependent flow rate, g(t), are determined from $$f(t) + g(t) = C_1,$$

and $$\frac{\psi(t) \times f(t) + \phi(t) \times g(t)}{f(t) + g(t)} = C_2,$$

wherein $C_1$ is the combined molar or volumetric flow rate and $C_2$ is a combined time-dependent fuel property value that is constant or limited to a selected fuel property value range.

Aspect 5. The process according to any one of aspects 1 to 4, wherein the selected flow rate range is ±5% of a mean value of the volumetric flow rate during the blowdown step.

Aspect 6. The process according to any one of aspects 1 to 5 wherein the first predefined time-dependent flow rate, f(t), the second predefined time-dependent flow rate, g(t), the fuel property value for the purge gas effluent (145), and the fuel property value for the blowdown gas (135) define a combined time-dependent fuel property value, wherein the combined time-dependent fuel property value is a constant fuel property value or limited to a selected fuel property value range. (i.e. limited fuel property value fluctuation)

Aspect 7. The process according to any one of aspects 1 to 6 wherein the first predefined time-dependent flow rate, f(t), and the second predefined time-dependent flow rate, g(t), are each calculated to provide a resultant fuel property value for a combined purge gas effluent and blowdown gas stream that is constant or limited to a selected fuel property value range.

Aspect 8. The process according to aspect 6 or aspect 7, wherein the selected fuel property value range is ±10% or ±5% of a mean value of the fuel property value during the blowdown step.

Aspect 9. The process according to any one of aspects 1 to 8,
wherein the fuel property value for the purge gas effluent (145) is a higher heating value (HHV) or a lower heating value (LHV) for the purge gas effluent (145), and
wherein the fuel property value for the blowdown gas (135) is a higher heating value (HHV) or a lower heating value (LHV) for the blowdown gas (135).

Aspect 10. The process according to any one of aspects 1 to 8,
wherein the fuel property value for the purge gas effluent (145) is a Wobbe index (WI) value for the purge gas effluent (145), and
wherein the fuel property value for the blowdown gas (135) is a Wobbe index (WI) value for the blowdown gas (135).

Aspect 11. The process according to any one of aspects 1 to 8,
wherein the fuel property value for the purge gas effluent (145) is a property value relating to a stoichiometric oxygen requirement for complete combustion of the purge gas effluent (145); and
wherein the fuel property value for the blowdown gas (135) is a property value relating to a stoichiometric oxygen requirement for complete combustion of the blowdown gas (135).

Aspect 12. The process according to aspect 11,
wherein the stoichiometric oxygen requirement for complete combustion of the purge gas effluent (145) is a combustion air requirement (CAR) for the purge gas effluent (145); and
wherein the stoichiometric oxygen requirement for complete combustion of the blowdown gas (135) is a combustion air requirement (CAR) for the blowdown gas (135).

Aspect 13. The process as claimed in any one of claims 1 to 12, wherein the first predefined time-dependent flow rate is greater than zero at any time during the purge step (140) and the second predefined time-dependent flow rate is greater than zero at any time during the blowdown step (130).

DETAILED DESCRIPTION OF THE PREFERRED EMBODIMENTS

Figure 1:
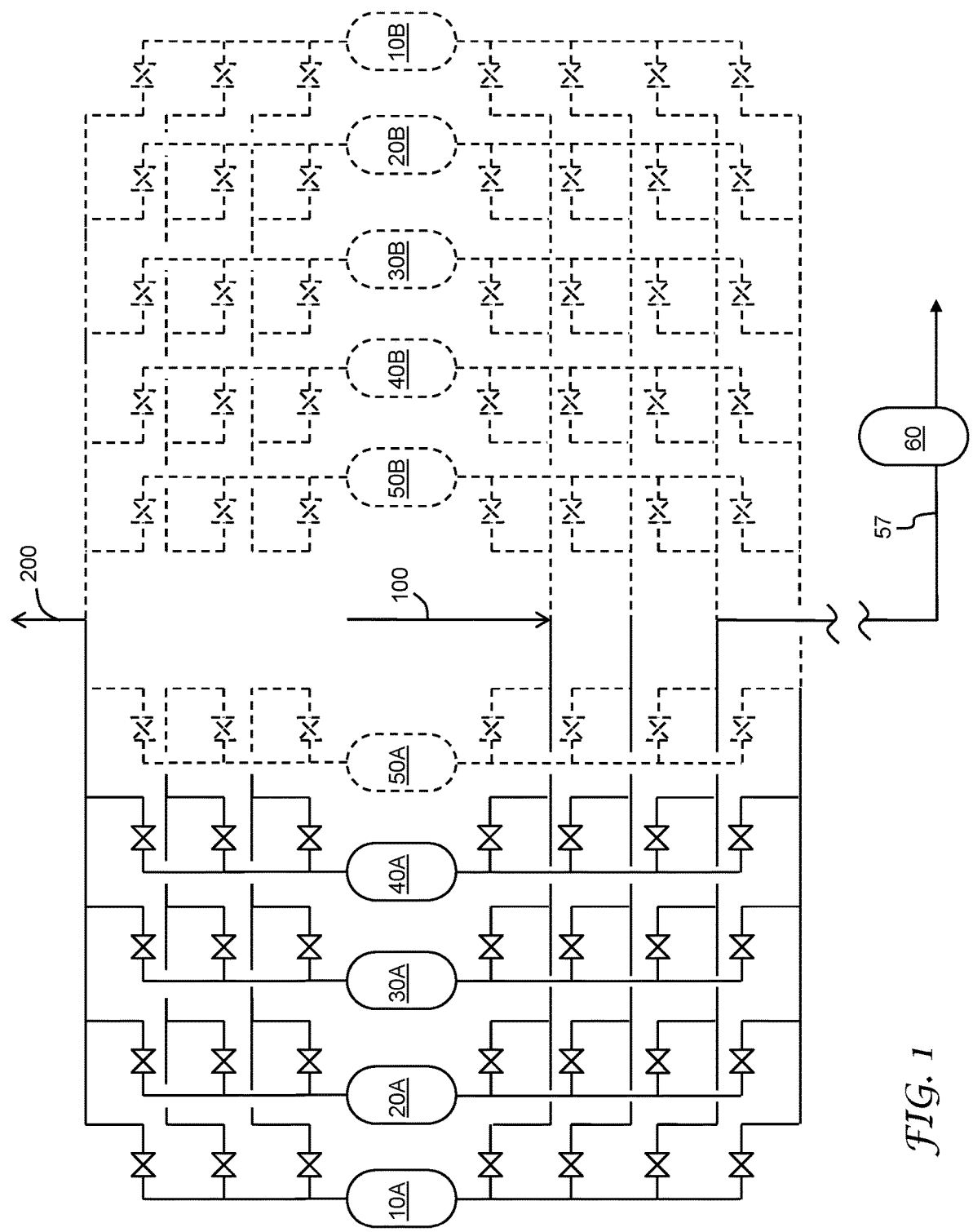
FIG. 1 is a schematic of an example adsorption system.

The ensuing detailed description provides preferred exemplary embodiments of the process, and is not intended to limit the scope, applicability, or configuration of the process. Rather, the ensuing detailed description of the preferred exemplary embodiments will provide those skilled in the art with an enabling description for implementing the preferred exemplary embodiments of the process, it being understood that various changes may be made in the function and arrangement of elements without departing from the scope of the process as defined by the claims.

The articles "a" and "an" as used herein mean one or more when applied to any feature in embodiments of the present invention described in the specification and claims.

The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all."

The term "depleted" means having a lesser mole % concentration of the indicated component than the original stream from which it was formed. "Depleted" does not mean that the stream is completely lacking the indicated component.

The terms "rich" or "enriched" means having a greater mole % concentration of the indicated component than the original stream from which it was formed.

As used herein, "flow rate" includes "volumetric flow rate," "molar flow rate," and "mass flow rate." The process may be adapted to use whichever is convenient.

The present process is a process for producing a product gas and a by-product gas from a feed gas mixture in an adsorption separation unit comprising a plurality of adsorption beds. The feed gas mixture comprises a primary gas component and secondary gas components. Each of the adsorption beds contain an adsorbent selective for the secondary gas components. The product gas is enriched with the primary gas component and the by-product gas is depleted of the primary gas component.

The feed gas mixture may be a water-depleted reformate from a catalytic steam-hydrocarbon reformer, where the feed gas mixture comprises $H_2$, CO, $CO_2$, and $CH_4$. The primary component may be $H_2$ where the product gas is a $H_2$-enriched gas. The secondary gas components may include CO, $CO_2$, and $CH_4$. The by-product gas may be a $H_2$-depleted gas.

Each of the plurality of adsorption beds is subjected to a repetitive cycle of steps (i.e. a pressure swing adsorption cycle of steps).

Figure 2:
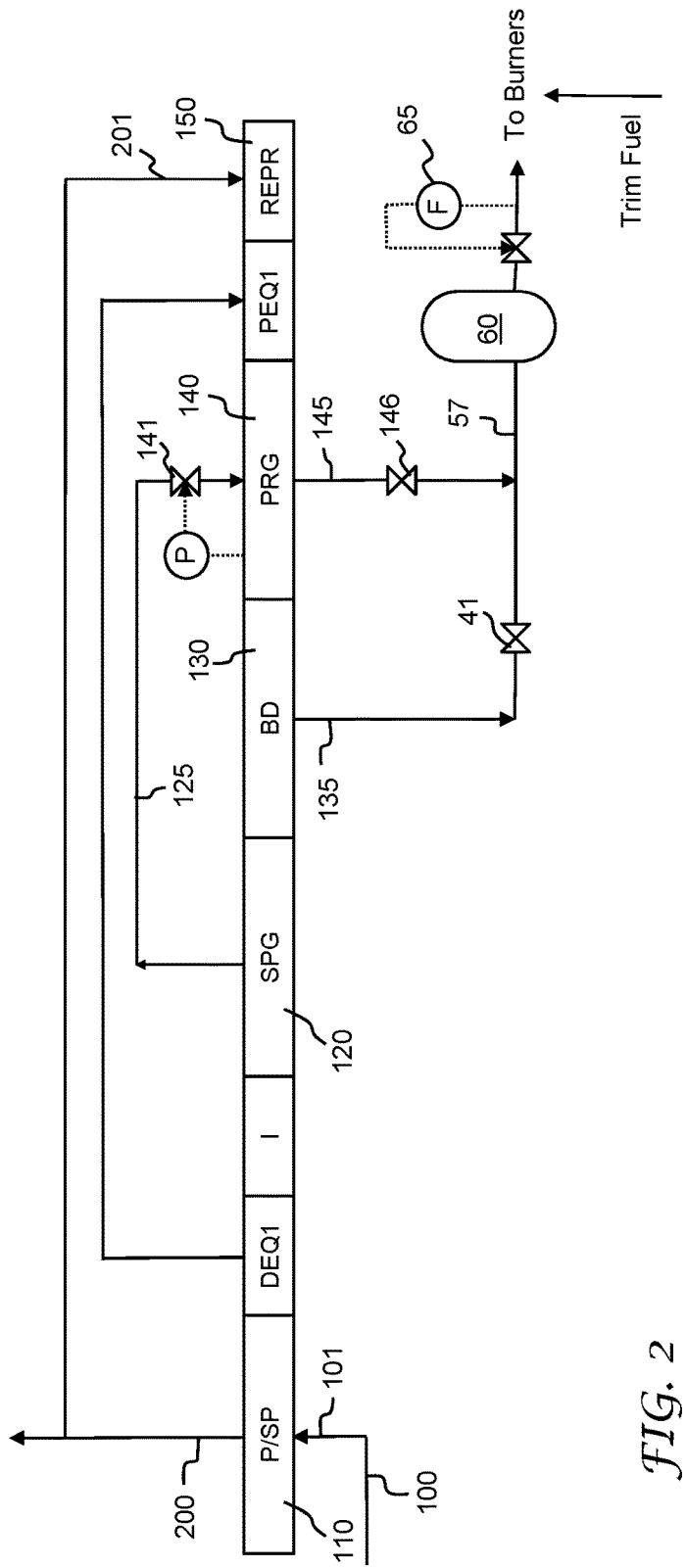
FIG. 2 is a cycle chart for a 6-bed adsorption cycle and hybrid process flow diagram showing the flow of streams for the process.
Figure 3:
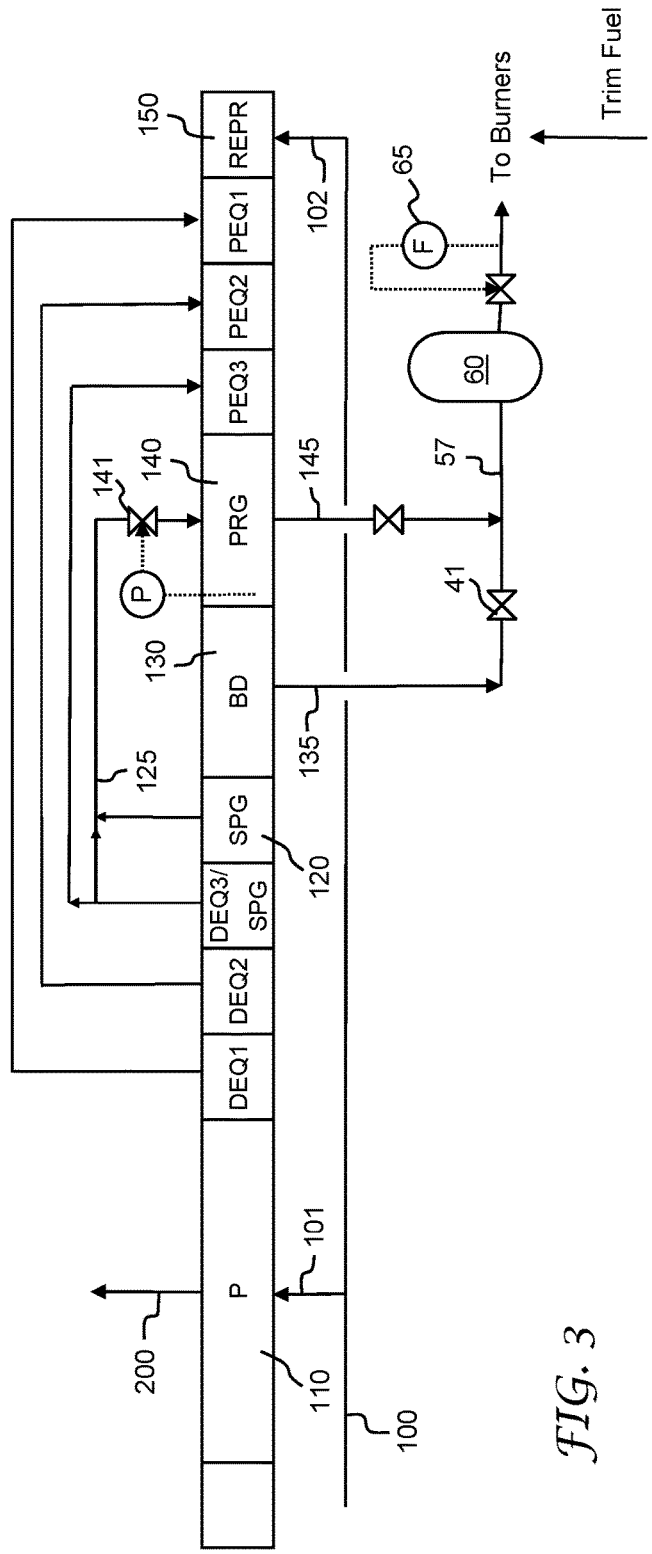
FIG. 3 is a cycle chart for an 8-bed adsorption cycle and hybrid process flow diagram showing the flow of streams for the process.

The present process is described with reference to the figures. FIG. 2 illustrates an exemplary 6-bed pressure swing adsorption cycle chart along with a hybrid process flow diagram for the cycle, and FIG. 3 illustrates an exemplary 8-bed pressure swing adsorption cycle chart along with a hybrid process flow diagram for the cycle. Details of the present process are described with reference to FIG. 2 and FIG. 3.

The 6-bed and 8-bed cycle charts and hybrid process flow diagrams are only exemplary. Any number of adsorption beds can be used with the present process subject to the limitations described below. Any pressure swing adsorption cycle can be used with the present process subject to the limitations described below.

The process comprises a production step 110. The production step is abbreviated as "P" in the cycle chart. The production step comprises introducing a stream 101 of the feed gas mixture 100 (e.g. a reformate comprising $H_2$, CO, $CO_2$, and $CH_4$) into an adsorption bed undergoing the production step 110 and adsorbing the secondary gas components (e.g. CO, $CO_2$, and $CH_4$) on the adsorbent in the adsorption bed undergoing the production step while simultaneously withdrawing a product gas stream 200 (e.g. $H_2$ product gas stream) from the adsorption bed undergoing the production step 110. The product gas contains a higher concentration of the primary gas component than the feed gas mixture and is depleted of the secondary gas components.

Any production step where a feed gas mixture is introduced and a product gas stream is simultaneously withdrawn may be used in the present process, for example the hybrid production steps Production/Rinse (P/R), Production/Supply Product (P/SP), Production/Rinse/Supply Product (P/R/SP), and Production/Supply Purge Gas (P/SPG), as disclosed in EP2823872 and US2014/0373713.

FIG. 2 shows a production step P/SP, where a portion 201 of the product gas 200 is used to supply product gas for repressurizing an adsorption bed undergoing a repressurization step (REPR) 150. FIG. 3 shows a production step without product gas being used to supply product gas for repressurizing an adsorption bed undergoing a repressurizing step. Instead, in FIG. 3, the bed undergoing the repressurizing step is repressurized using a portion 102 of the feed gas stream 100.

Each of the adsorption beds has a "feed end" and a "product end," so termed because of their function during the production step of the adsorption cycle. A feed gas mixture is introduced into the "feed end" of the adsorption bed and a product gas is withdrawn from the "product end" during the production step of the cycle. During other steps of the adsorption cycle, gas may be introduced or withdrawn from the "feed end." Likewise, during other steps of the adsorption cycle, gas may be introduced or withdrawn from the "product end."

The direction of flow during other steps is typically described with reference to the direction of flow during the production step. Thus, gas flow in the same direction as the gas flow during the production step is "co-current" (sometimes called "concurrent") and gas flow that is in the opposite direction to the gas flow during the production step is "counter-current." Co-currently introducing a gas into an adsorption bed means to introduce the gas in the same direction as the feed gas introduced during the production step (i.e. introducing into the feed end). Counter-currently introducing a gas into an adsorption bed means to introduce the gas in a direction opposite to the direction of the feed gas flow during the feed step (i.e. introducing into the product end). Co-currently withdrawing a gas from an adsorption bed means to withdraw the gas in the same direction as the product gas during the production step (i.e. withdrawing from the product end). Counter-currently withdrawing a gas from an adsorption bed means to withdraw the gas in a direction opposite to the direction of the product gas flow during the production step (i.e. withdrawing from the feed end).

The process may include any suitable number of depressurizing equalization and complementary pressurizing equalization steps as desired. The number of depressurizing equalization and complementary pressurizing equalization steps may depend on the number of adsorption beds used. Various depressurizing equalization and pressurizing equalization steps are described in EP2823872 and US2014/0373713.

FIG. 2 shows a cycle with 1 set of depressurizing equalization and complementary pressurizing equalization steps. FIG. 3 shows a cycle with 3 sets of depressurizing equalization and complementary pressurizing equalization steps.

The process comprises a supply purge gas step 120. The supply purge gas step is abbreviated "SPG" herein. The supply purge gas step (SPG) 120, comprises co-currently withdrawing a stream of purge gas 125 from an adsorption bed undergoing the supply purge gas step 120, and passing the stream of purge gas 125 from the adsorption bed undergoing the supply purge gas step 120 to an adsorption bed undergoing a purge step (PRG) 140.

An adsorption bed undergoing a supply purge gas step may supply purge gas to one or more adsorption beds undergoing a purge step.

Any supply purge gas step where a stream of purge gas is co-currently withdrawn and passed to one or more adsorption bed undergoing a purge step may be used in the present process, for example the hybrid supply purge gas steps with feed (SPG/F), rinse (SPG/R), and blowdown (SPG/BD) as disclosed in EP2823872 and US2014/0373713.

The process comprises a blowdown step 130. The blowdown step is abbreviated "BD" in the cycle charts. The blowdown step comprises counter-currently withdrawing a stream of blowdown gas 135 from an adsorption bed undergoing the blowdown step 140. The stream of blowdown gas has a flow rate that is regulated by valve 41. The blowdown gas has a concentration of the primary gas component that is lower than the concentration of the primary gas component in the feed gas mixture.

Any blowdown step where a blowdown gas is counter-currently withdrawn may be used in the present process, for example a hybrid depressurizing equalization/blowdown step DEQ/BD as disclosed in EP2823872 and US2014/0373713.

The process comprises a purge step 140. The purge step is abbreviated "PRG" in the cycle charts. The purge step comprises counter-currently introducing the stream of purge gas 125 from the adsorption bed undergoing the supply purge gas step 120 into an adsorption bed undergoing the purge step 140 and counter-currently withdrawing a stream of purge gas effluent 145 from the adsorption bed undergoing the purge step 140. The purge gas effluent 145 has a concentration of the secondary gas components that is higher than the concentration of the secondary gas components in the feed gas mixture 100.

The process comprises a repressurization step 150. The repressurization step is abbreviated "REPR" in the cycle charts. The repressurization step comprises increasing the pressure in an adsorption bed undergoing the repressurization step 150 by at least one of (i) co-currently introducing a second stream 102 of the feed gas mixture (100) into the adsorption bed undergoing the repressurization step 150 as shown in FIG. 3, and (ii) counter-currently introducing a portion 201 of the product gas stream 200 from the adsorption bed undergoing the production step 110 into the adsorption bed undergoing the repressurization step 150 as shown in FIG. 2. Since the repressurization step includes at least one of (i) and (ii), it means that both (i) and (ii) can be provided. The pressure in the adsorption bed undergoing the repressurizing step may be increased until the pressure is substantially at (e.g. within 5% of up to and including) the feed gas pressure.

As used herein, the term "repressurization step" is a generic term that includes the various product pressurization steps, and hybrid forms thereof, and the various feed pressurization steps, and hybrid forms thereof, cf. EP2823872 and US2014/0373713.

According to the present process, at least one adsorption bed undergoes at least part of the purge step 140 simultaneously with at least one other adsorption bed undergoing at least part of the blowdown step 130, i.e. at least one adsorption bed undergoes at least part of the purge step 140 while at least one other adsorption bed undergoes at least part of the blowdown step 130. The stream of purge gas effluent 145 from the adsorption bed undergoing the purge step 140 is combined with the stream of blowdown gas 135 from the adsorption bed undergoing the blowdown step 130 to form a by-product gas (tail gas) stream 57. The stream of blowdown gas 135 is withdrawn from the bed undergoing the blowdown step 130 simultaneously with the withdraw of the stream of purge gas effluent 145 from the bed undergoing the purge step 140 during at least part of the purge step. The stream of blowdown gas 135 may be withdrawn from the bed undergoing the blowdown step 130 simultaneously with the withdrawal of the stream of purge gas effluent 145 from the bed undergoing the purge step 140 during essentially all (at least 95% of the cycle step time) of the purge step and the blowdown step.

The present process is suitable for adsorption cycles with concurrent purge and blowdown steps, for example, the adsorption cycles shown in FIG. 2 and FIG. 3 of the present disclosure, and FIGS. 5, 10, 11, 13, 14, 15, 17, 18, 21, 24, 25, 26, 27, 30, 32, 34, 35, 36, 37, 38, 39, 40, 41, 42, 44, 45, 46, 48, 51, 52, 53, 54, 55, 56, 57, 58, 59, 61, 62, 63, 64, 65, 66, 67, and 68 of "Pressure Swing Adsorption cycles for 7 or more Adsorption Beds," IP.com Number 000241449, Apr. 29, 2015, available online and in the printed IP.com Journal.

The process comprises introducing the by-product gas stream 57 into a surge vessel 60 and withdrawing the by-product gas stream 57 from the surge vessel 60. The surge vessel helps to dampen fluctuations of pressure and flow of the by-product gas stream 57.

The by-product gas stream 57 may be passed from the surge vessel 60 to a plurality of burners in a reformer furnace. A supplemental fuel (trim fuel) may also be passed to the burners in the reformer furnace to provide the energy required for the reforming process.

In the present process, the flow rate of the stream of purge gas 125 from the adsorption bed undergoing the supply purge gas step 120 is regulated to target a first predefined time-dependent flow rate of the purge gas effluent 145 from the adsorption bed undergoing the purge step 140. The flow rate of the stream of purge gas 125 withdrawn from the adsorption bed undergoing the supply purge gas step may be regulated, for example, by a valve 141 downstream of the adsorption bed undergoing the supply purge gas step 120.

The stream of purge gas 125 has a flow rate that may be controlled, for example by a valve 141 upstream of the adsorption bed undergoing the purge step. The flow rate of the purge gas 125 introduced into the adsorption bed undergoing the purge step may be controlled in order to regulate the flow rate of the stream of purge gas effluent 145 to target the first predefined time-dependent flow rate for the purge gas effluent 145.

The flow rate of the stream of blowdown gas 135 from the adsorption bed undergoing the blowdown step 130 is regulated to target a second predefined time-dependent flow rate. The flow rate of the stream of blowdown gas 135 may be regulated, for example, by a valve 41 downstream of the adsorption bed undergoing the blowdown step 130.

As will be discussed in more detail below, the first predefined time-dependent flow rate is calculated from a function relating a fuel property value for the purge gas effluent 145 to a cumulative flow of the purge gas effluent using a characteristic curve for the purge gas effluent. Also, the second predefined time-dependent flow rate is calculated from a function relating a fuel property value for the blowdown gas 135 to a cumulative flow of the blowdown gas 135 using a characteristic curve for the blowdown gas. The same fuel property is conveniently selected for the purge gas effluent 145 and the blowdown gas 135.

The fuel property may be selected from higher heating value (HHV), lower heating value (LHV), Wobbe index (WI), and a property related to a stoichiometric oxygen requirement for complete combustion of a fuel stream, for example, combustion air requirement (CAR).

CAR is the stoichiometric oxygen requirement for complete combustion of a fuel, defined as a ratio of the volume of air to the volume of fuel. CAR is a common term used in the field of combustion. In case air is not used, the term can be readily modified to account for the oxygen concentration of the combustion oxidant. For a discussion on the combustion air requirement, the reader is referred to (1) the North American Combustion Handbook, Vol. 1, $3^{rd}$ Edition, pp. 45-48, 1986, (2) "Theoretical Introduction to the use of a Residual Oxygen Measurement Method for the Analysis of Combustion Air Requirement Index (CARI) and Wobbe Index of Fuel Gases," McGowan et al., COSA Xentaur, (3) "Methodology for Residual Oxygen calorimetry," Hailey, COSA Xentaur, and (4) US2017/115246.

In order to limit the flow rate fluctuation of the resulting by-product stream 57, the first predefined time-dependent flow rate and the second predefined time-dependent flow rate are each calculated to provide a combined molar or volumetric flow rate that is constant or limited to a selected flow rate range. The selected flow rate range may be ±5% of a mean value of the combined molar or volumetric flow rate during the blowdown step.

In order to limit the time-dependent fuel property value fluctuation of the resulting by-product stream 57, a combined time-dependent fuel property value may be limited to a selected fuel property value range or a constant fuel property value. The first predefined time-dependent flow rate, the second predefined time-dependent flow rate, the fuel property value for the purge gas effluent 145, and the fuel property value for the blowdown gas 135 define a combined time-dependent fuel property value, as discussed in more detail below. The first predefined time-dependent flow rate and the second predefined time-dependent flow rate are each calculated to provide a resultant fuel property for a combined purge gas effluent and blowdown gas stream that is constant or limited to a selected fuel property value range. The selected fuel property value range may be ±5% of a mean value of the combined fuel property value during the blowdown step.

While the flow rates and fuel property values of the stream of purge gas effluent 145 and the stream of blowdown gas 135 normally change over the duration of the respective step, the inventors have discovered that, for a pressure swing process with concurrent (occurring at the same time) purge step and blowdown step, certain fuel properties of the stream of purge gas effluent 145 and the stream of blowdown gas 135 can be made complementary. Intelligently mixing the stream of purge gas effluent 145 and the stream of blowdown gas can result in a by-product gas stream 57 with a substantially constant flow rate and with a substantially constant fuel property value. Furthermore, the inventors have developed a method to design this intelligent mixing.

Several benefits can be realized by providing a by-product gas stream 57 with a substantially constant flow rate. A smaller surge vessel 60 can be used because the variation in pressure and flow rate of the by-product stream 57 is reduced. Valves operatively disposed downstream of the surge vessel and upstream of the burners of the reformer furnace can be eliminated or be full open such that the surge vessel can be operated at a lower pressure. By operating the surge vessel 60 at a lower pressure, the final blowdown pressure and purge gas pressure can be lower, resulting in yield and efficiency improvements for the pressure swing adsorption unit.

Additional benefits can be realized in the steam-hydrocarbon reforming process by providing a by-product gas stream 57 with a substantially constant fuel property value. For illustration purposes, the combustion air requirement is discussed, but the discussion applies for each of the fuel properties listed above.

The by-product gas stream along with a supplemental (trim) fuel are typically used as fuel in a steam-hydrocarbon reforming furnace to provide the energy for the reforming reaction. Maintaining a substantially constant combustion air ratio (CAR) for a steam-hydrocarbon reforming furnace can be particularly beneficial.

When the combustion air requirement for the by-product gas stream fluctuates, the set point for the combustion air flow rate is generally set to ensure complete combustion taking into account the expected fluctuations in the combustion air requirement and fuel flow rate. The set point for the combustion air flow rate is heavily influenced by the maximum combustion air requirement expected.

In case fluctuations in the combustion air requirement for the by-product gas stream 57 can be reduced and the combustion air requirement made to match a mean value, the set point for the combustion air flow rate can be reduced to match a lower combustion air requirement. A decrease in the set point for the combustion air flow rate translates into improved furnace efficiency and improved efficiency of the steam-hydrocarbon reforming process.

The first predefined time-dependent flow rate and the second predefined time-dependent flow rate can be determined as described below. For illustrative purposes, molar flow rates are used in the description.

Intelligent mixing can be described mathematically using two main equations. The first predefined time-dependent molar flow rate for the stream of purge gas effluent 145 may be represented by f(t) at any given time in the purge step 140, and the second predefined time-dependent molar flow rate for the stream of blowdown gas may be represented by g(t) at any given time in the blowdown step 130. The first main design equation requires that the combined value for the first predefined time-dependent molar flow rate and the second predefined time-dependent molar flow rate at any given time in during the overlap of the purge step 140 and the blowdown step 130 is a constant value or limited to a selected flow rate range. In this analysis, a constant value, $C_1$, is used. $C_1$ is the mean molar flow rate of the combined stream during the overlap of the purge step 140 and the blowdown step 130. The first main design equation may be written:

$$f(t)+g(t)=C_1.$$

When the flow rate of the stream of purge gas effluent 145 is regulated to target the first predefined time-dependent flow rate and the flow rate of the stream of blowdown gas 135 is regulated to target the second predefined time-dependent flow rate, the flow rate of by-product gas stream 57 will be essentially constant at any given time of the cycle step. To satisfy the boundary condition of this equation $$C_1 = \frac{\int_0^\tau f(t)dt + \int_0^\tau g(t)dt}{\tau} = \frac{F^* + G^*}{\tau}$$

where F* and G* are the total cumulative moles of purge gas effluent and blowdown gas, respectively, leaving their respective adsorption beds for the total cycle step time, r is the total cycle step time, and $C_1$ is the mean molar flow rate of the combined value for the first predefined time-dependent molar flow rate and the second predefined time-dependent molar flow rate.

The fuel property value for the stream of purge gas effluent may be represented by $\psi(t)$ and the fuel property value for the stream of blowdown gas may be represented by $\phi(t)$.

The second main design equation requires that the molar flow rate-normalized instantaneous fuel property value for the combined purge gas effluent and blowdown gas streams at any given time in the cycle step is a constant fuel property value or limited to a selected fuel property value range, for example within 10% or 5% of a mean value for the combined purge gas effluent and blowdown gas streams. In this analysis, a constant value, $C_2$, is used. The second main design equation may be written:

$$\frac{\psi(t) \times f(t) + \phi(t) \times g(t)}{f(t) + g(t)} = C_2.$$

When this equation is satisfied, the fuel property value of the by-product gas stream is constant at any given time of the cycle step. To satisfy the boundary condition of this equation $$C_2 = \frac{\int_0^\tau \psi(t)f(t)dt + \int_0^\tau \phi(t)g(t)dt}{F^* + G^*},$$

where F* and G* are the total cumulative moles of purge gas effluent and blowdown gas, respectively, leaving their respective adsorption beds for the total cycle step time, r is the total cycle step time, and $C_2$ is the mean fuel property value of the by-product gas stream.

To use these two equations to design the intelligent mixing, $\psi$ and $\phi$ need to be related to f(t) and g(t), respectively, so that two unknowns in f(t) and g(t) can be solved from the two equations. To circumvent problems in defining these relationships in the cycle time space, an essential assumption can be made that the function representing the fuel property value for the purge gas effluent, $\psi$, and the function representing the fuel property value for the blowdown gas, $\phi$, varies with the cumulative moles of effluent gas out of the respective adsorption bed following a well-defined function or a "characteristic curve", independent of how the flow rate of the stream of purge gas effluent, f(t), or the flow rate of the stream of blowdown gas, g(t), changes with time. For example, when half of the moles of purge gas effluent have left the adsorption bed, the fuel property value of that stream at the halfway point is the same regardless of what flow rates were used to get to the halfway point. This assumption was validated with modeling and lab experiments for typical $H_2$ PSA processes (see examples). This assumption transforms the dependence of $\psi$ and $\phi$ on f(t) and g(t) from the cycle time space to a cumulative mole flow space via $$F(t)=\int_0^t f(t)dt, \text{ and}$$

$$G(t)=\int_0^t g(t)dt.$$

The second design equation becomes $$[\psi(F(t)) \times f(t) + \phi(G(t)) \times g(t)]/[f(t)+g(t)]=C_2$$

where $\psi(F(t))$ and $\phi(G(t))$ are the characteristic curves for the stream of purge gas effluent and the stream of blowdown gas, respectively. The assumption of characteristic curve has been proven by simulations and lab experiments.

Figure 4:
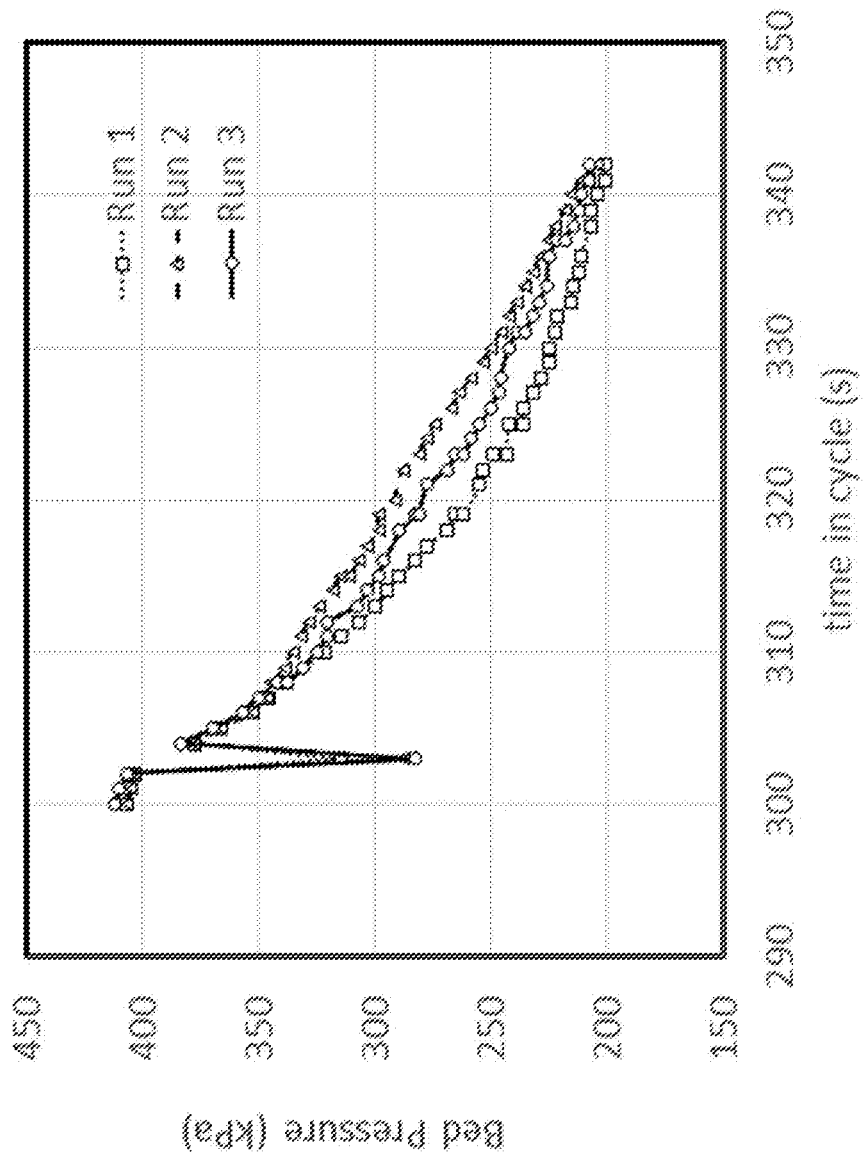
FIG. 4 is a plot of bed pressure as a function of time in the cycle step for an adsorption bed undergoing the blowdown step for 3 different operating conditions.

To demonstrate, FIG. 4 plots the adsorption bed pressure of the bed undergoing the blowdown step as a function of time during the blowdown step. The data is for a 6 bed $H_2$ PSA cycle with concurrent purge and blowdown steps as shown in FIG. 2. Three operating conditions were tested, where the flow rate of the blowdown gas was varied while the conditions for all other steps were maintained the same. In the first operating condition (Run 1), the Cv of the valve 41 controlling the outflow of blowdown gas was decreased during the blowdown step. In the second operating condition (Run 2), the Cv of the valve 41 controlling the outflow of blowdown gas was increased during the blowdown step. In the third operating condition (Run 3), the Cv of the valve 41 controlling the outflow of blowdown gas was maintained constant during the blowdown step. The result is three different pressure profiles for the bed undergoing the blowdown step as shown in FIG. 4.

Figure 5:
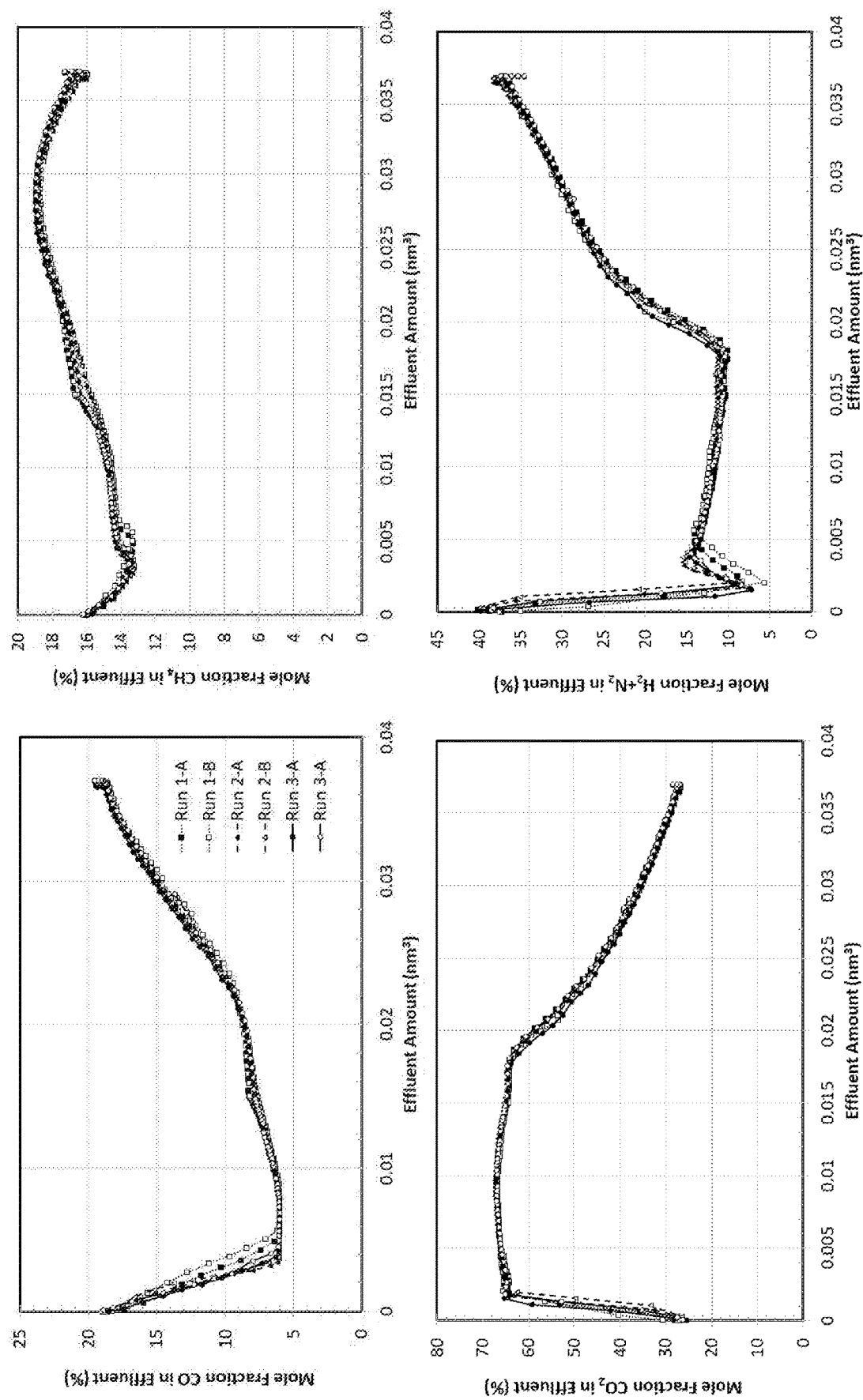
FIG. 5 shows plots of mole fraction of representative components in the blowdown gas stream as a function of cumulative moles out of the adsorption bed.

FIG. 5 plots the mole fraction for 4 representative components (CO, $CH_4$, $CO_2$, and $H_2+N_2$) of the blowdown gas stream as a function of cumulative moles out of the adsorption bed. Data was collected for 2 experiments (A and B) for each of the operating conditions. In spite of the different pressure profiles, the mole fraction for each of the representative components as a function of the cumulative effluent moles out of the bed undergoing the blowdown step follows a characteristic curve. The scatter in the curves is on the order of the scatter of repeat experiments (i.e. A vs. B). Similar lab results were observed for the purge step using three different pressure profiles.

While FIG. 5 shows the characteristic curves in terms of the mole fractions of the representative components in the blowdown gas stream, since fuel properties such as CAR, HHV, LHV, and Wobbe Index are all functions of the composition of the gas stream only, FIG. 5 indirectly shows the existence of characteristic curves for the fuel properties.

Consequently, the first predefined time-dependent flow rate is calculated from a function relating the fuel property value for the purge gas effluent 145 to a cumulative flow of the purge gas effluent 145, and the second predefined time-dependent flow rate is calculated from a function relating the fuel property value for the blowdown gas 135 to the cumulative flow of the blowdown gas 135.

For the intelligent mixing design to be possible, the characteristic curves of $\psi(F(t))$ and $\phi(G(t))$ need to be on the opposite sides of C2. That is, one needs to be greater than or equal to C2 and the other smaller than or equal to C2. As shown in the examples below, these two conditions can be met, or at least, for the major portion of the cycle step.

Once the characteristic curves for a PSA cycle design are available, the two equations can be solved readily, for example, using numerical equations for differentiation and integration, for example, using a spreadsheet program.

Example 1

The conditions summarized in Table 1 and 2 are those used in the lab experiments that produced results shown in FIGS. 4 and 5. Table 1 shows the performance when the PSA cycle reached cyclic steady state for the 3 different blowdown conditions. Except $N_2$ and CO purities for Experiment 3, the performance is almost identical at the three conditions. This observation is important in that it allows designs using different rate or pressure profiles without impacting the performance.

Table 2 shows the pressure at the bottom of the adsorption bed undergoing purge step and the end-of-step pressure of representative steps for the 3 different blowdown conditions. These are meant to represent the states of each bed at the beginning and end of a cycle step. The experimental results show that these beginning and end states are almost identical, independent of the blowdown conditions; all scatter is within the experimental error range. This observation is important since the characteristic curve depends on the initial state of the purge or blowdown step. If this initial state changes, there will never be a characteristic curve. Likewise, a characteristic curve implies that the adsorption bed reaches the same state at the end of the purge or blowdown step, independent of how the end of the step is reached. This implication is also validated by the experiments.

Similar experiments were conducted by using three different flow rate profiles for the purge gas effluent stream from the adsorption bed undergoing the purge step, while keeping the conditions of all other steps constant, characteristic curves were also observed for the purge gas stream in these experiments.

Example 2

This example illustrates the intelligent mixing design with the combustion air requirement (CAR) or the stoichiometric oxygen requirement as the fuel property. The stoichiometric oxygen requirement for a stream can be calculated from its chemical composition. The stoichiometric amount of oxygen can be calculated knowing the concentration of each of the combustible species.

The results in this example are based on simulations. A typical 10 bed H2 PSA cycle was selected in the simulation. The steady state solution from the simulation provides composition as a function of time for the purge step and blowdown step, respectively, from which the characteristic curve of CAR for each step can be constructed. The simulation also provides F* and G*.

The simulation can be conducted conveniently, using commercially available software, for example, ASPEN Adsorption™ from AspenTech or developing a simulation routine as outline in "Software development for designing gas adsorption processes," Alivand et al., Gas Processing, Gulf Publishing Company, December 2017, the gaseous species concentrations for the stream of purge gas effluent and stream of blowdown gas during the cycle step can be predicted. From the gaseous species concentrations, the stoichiometric oxygen requirement for the stream of blowdown gas and the stream of purge gas effluent can be calculated.

With the characteristic curves, F* and G*, f(t) and g(t) were solved from the two design equations using numerical equations for differentiation and integration in a spreadsheet. The numerical method is straightforward and does not involve iteration.

Figure 6:
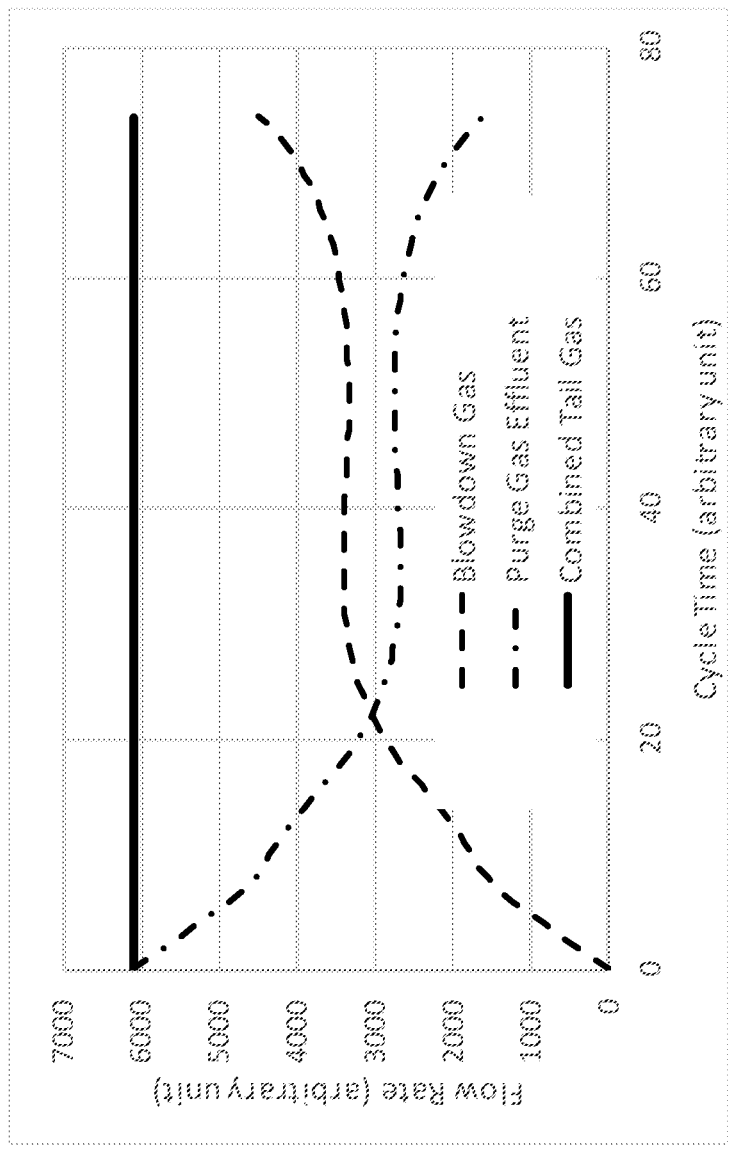
FIG. 6 is a plot of flow rate as a function of cycle time for the blowdown gas, purge gas effluent, and the combined tail gas for operation according to the present disclosure.

FIG. 6 shows the flow rate for the stream of purge gas effluent and the flow rate for the stream of blowdown gas as a function of the time over the duration of the cycle step. These two flow rate profiles are the solutions of the two design equations, with the characteristic curves for the stream of purge gas effluent and the stream of blowdown gas being obtained by simulations. The combined flow rate from these two streams is constant over the duration of the cycle step.

Figure 7:
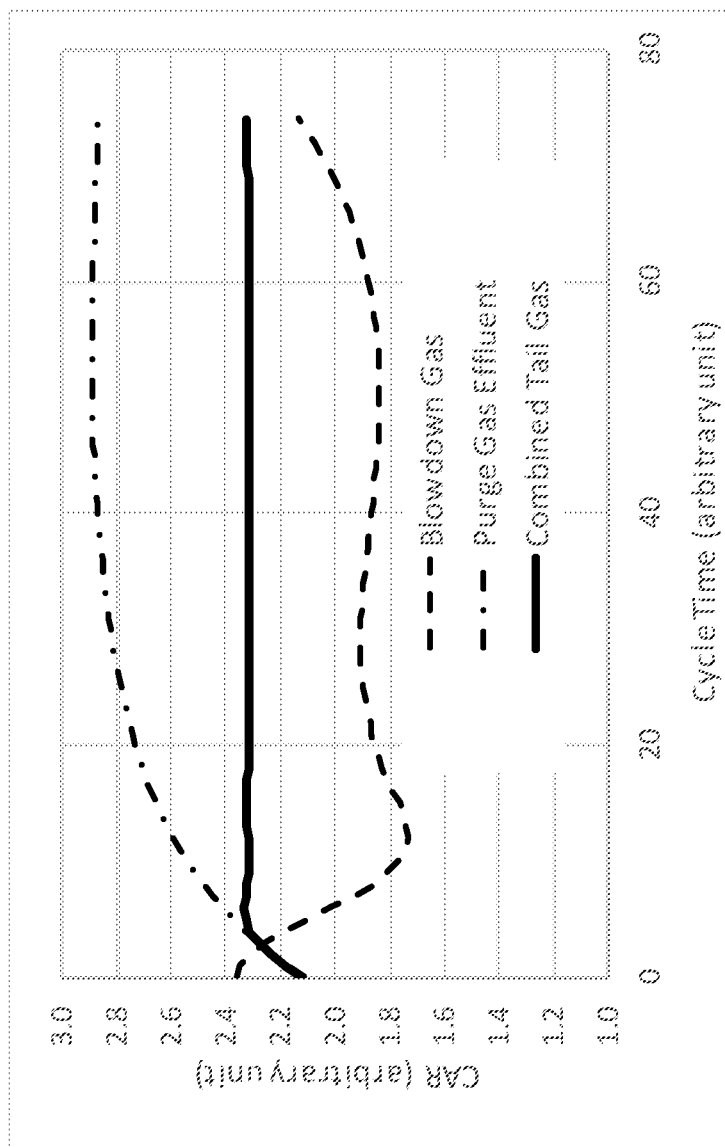
FIG. 7 is a plot of CAR as a function of cycle time for the blowdown gas, purge gas effluent, and the combined tail gas for operation according to the present disclosure.

FIG. 7 shows the CAR for the stream of purge gas effluent and the CAR for the stream of blowdown gas as a function of the time over the duration of the cycle step. These two CAR profiles are the solutions of the two design equations. The combined CAR from these two streams is constant over the duration of the cycle step. This constant is the average CAR of the entire combined stream. Also note that the CAR of the blowdown gas stream is below this average and that

TABLE 1

| Experiment | Feed vol./cycle | Product vol./cycle | Blowdown vol./cycle | Purge vol./cycle | H2 recovery | N2 purity ppm | CO purity ppm |
|---|---|---|---|---|---|---|---|
| 1 | 1.000 | 1.000 | 1.000 | 1.000 | 1.000 | 100 | 100 |
| 2 | 1.000 | 0.996 | 1.016 | 0.976 | 1.001 | 106 | 112 |
| 3 | 1.002 | 0.996 | 1.000 | 1.012 | 0.994 | 146 | 1.63 |

TABLE 2

| | Purge | Pressure at the end of step | | | | | |
|---|---|---|---|---|---|---|---|
| Experiment | bed P Bottom | Feed | EQ2 | Provide purge | EQ4 | Blowdown | Purge |
| 1 | 1.000 | 1.000 | 1.000 | 1.000 | 1.000 | 1.000 | 1.000 |
| 2 | 0.987 | 1.000 | 1.010 | 1.026 | 1.009 | 1.082 | 1.000 |
| 3 | 1.000 | 0.995 | 1.014 | 1.013 | 0.993 | 1.025 | 0.889 | of the purge gas effluent stream is above the average during the major portion of the step except a very short time period at the beginning.

Example 3

Figure 8:
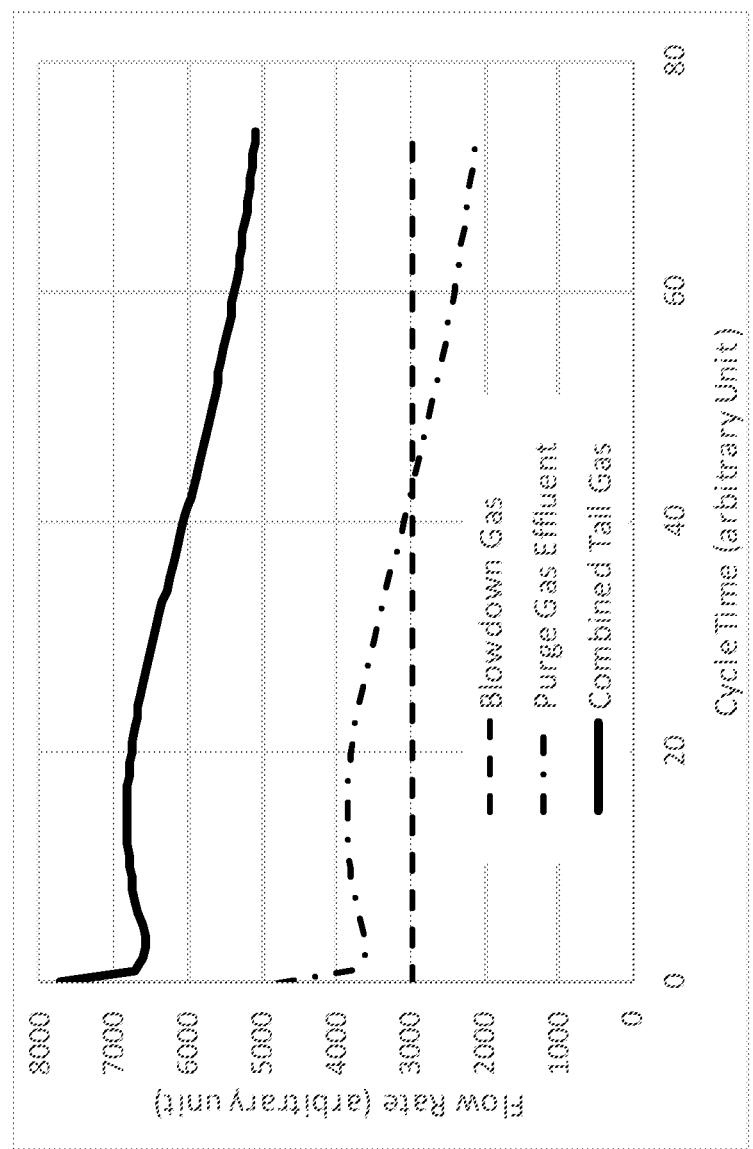
FIG. 8 is a plot of flow rate as a function of cycle time for the blowdown gas, purge gas effluent, and the combined tail gas for operation using typical flow rate profiles.
Figure 9:
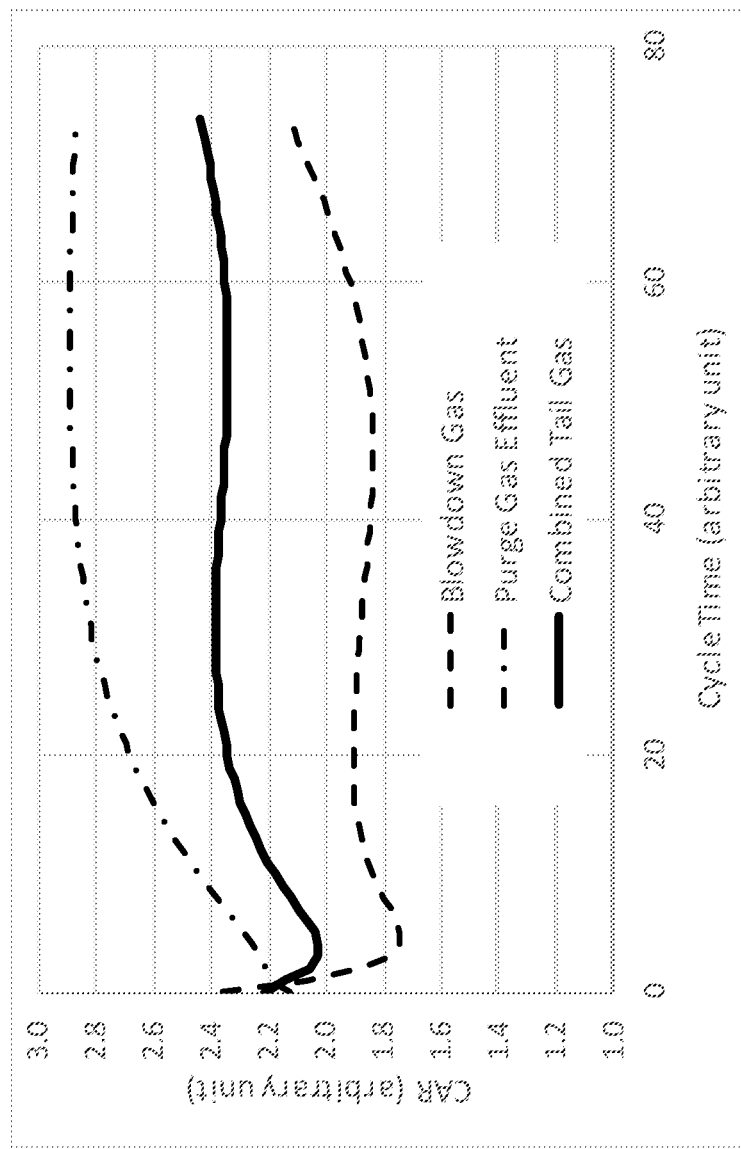
FIG. 9 is a plot of CAR as a function of cycle time for the blowdown gas, purge gas effluent, and the combined tail gas for operation using typical flow rate proviles.

Example 3 is a comparative example to Example 2. It is based on the same 10 bed H2 PSA cycle. Conventional flow rate profiles for such a cycle are used for this example. As shown in FIG. 8, these two rate profiles result in a combined tail gas flow that changes with the time over the duration of the cycle step. Using the same characteristic curves used in Example 2, the resulting CAR profiles have been calculated and plotted in FIG. 9. It can be seen that the CAR of the combined tail gas stream varies over the duration of the cycle step.

What is claimed is:

1. A pressure swing adsorption process comprising:
   a production step, which comprises introducing a stream of the feed gas mixture into an adsorption bed undergoing the production step and adsorbing a secondary gas components on an adsorbent in the adsorption bed undergoing the production step while simultaneously withdrawing a product gas stream from the adsorption bed undergoing the production step;
   a supply purge gas step, which comprises co-currently withdrawing a stream of purge gas from an adsorption bed undergoing the supply purge gas step, and passing the stream of purge gas from the adsorption bed undergoing the supply purge gas step to an adsorption bed undergoing a purge step;
   a blowdown step, which comprises counter-currently withdrawing a stream of blowdown gas from an adsorption bed undergoing the blowdown step;
   the purge step, which comprises counter-currently introducing the stream of purge gas from the adsorption bed undergoing the supply purge gas step into an adsorption bed undergoing the purge step and counter-currently withdrawing a stream of purge gas effluent from the adsorption bed undergoing the purge step;
   a repressurization step, which comprises increasing the pressure in an adsorption bed undergoing the repressurization step by at least one of (i) co-currently introducing a second stream of the feed gas mixture into the adsorption bed undergoing the repressurization step, or (ii) counter-currently introducing a portion of the product gas stream from the adsorption bed undergoing the production step into the adsorption bed undergoing the repressurization step;
   wherein at least one adsorption bed undergoes at least part of the purge step simultaneously with at least one other adsorption bed undergoing at least part of the blowdown step, and the stream of purge gas effluent from the adsorption bed undergoing the purge step is combined with the stream of blowdown gas from the adsorption bed undergoing the blowdown step to form a by-product gas stream;
   introducing the by-product gas stream into a surge vessel;
   withdrawing the by-product gas stream from the surge vessel;
   regulating the flow rate of the stream of purge gas from the adsorption bed undergoing the supply purge gas step to target a first predefined time-dependent flow rate, f(t), of the purge gas effluent from the adsorption bed undergoing the purge step; and
   regulating the flow rate of the stream of blowdown gas from the adsorption bed undergoing the blowdown step to target a second predefined time-dependent flow rate, g(t);
   wherein the first predefined time-dependent flow rate, f(t), is calculated from a function relating a fuel property value, $\psi$, for the purge gas effluent to a cumulative flow of the purge gas effluent;
   wherein the second predefined time-dependent flow rate, g(t), is calculated from a function relating a fuel property value, $\phi$, for the blowdown gas to a cumulative flow of the blowdown gas; and
   wherein the first predefined time-dependent flow rate, f(t), and the second predefined time-dependent flow rate, g(t), are each calculated to provide a combined molar or volumetric flow rate that is constant or limited to a selected flow rate range.

2. The process as claimed in claim 1, wherein the fuel property value, $\psi$, for the purge gas effluent is determined, by simulation or measurement, as a function of the cumulative flow of the purge gas effluent in the purge step.

3. The process as claimed in claim 1, wherein the fuel property value, $\phi$, for the blowdown gas is determined, by simulation or measurement, as a function of the cumulative flow of the blowdown gas in the blowdown step.

4. The process as claimed in claim 1,
   wherein the fuel property value, $\psi$, for the purge gas effluent is determined, by simulation or measurement, as a function of the cumulative flow of the purge gas effluent in the purge step, and
   wherein the fuel property value, $\phi$, for the blowdown gas is determined, by simulation or measurement, as a function of the cumulative flow of the blowdown gas in the blowdown step.

5. The process as claimed in claim 1, wherein the first predefined time-dependent flow rate, f(t), and the second predefined time-dependent flow rate, g(t), are determined from $$f(t) + g(t) = C_1,$$

and $$\frac{\psi(t) \times f(t) + \phi(t) \times g(t)}{f(t) + g(t)} = C_2,$$

wherein $C_1$ is the combined molar or volumetric flow rate and $C_2$ is a combined time-dependent fuel property value that is constant or limited to a selected fuel property value range.

6. The process as claimed in claim 1, wherein the selected flow rate range is ±5% of a mean value of the volumetric flow rate during the blowdown step.

7. The process as claimed in claim 1 wherein the first predefined time-dependent flow rate, f(t), the second predefined time-dependent flow rate, g(t), the fuel property value for the purge gas effluent, and the fuel property value for the blowdown gas define a combined time-dependent fuel property value, wherein the combined time-dependent fuel property value is a constant fuel property value or limited to a selected fuel property value range.

8. The process as claimed in claim 7, wherein the selected fuel property value range is ±5% of a mean value of the fuel property value during the blowdown step.

9. The process as claimed in claim 1 wherein the first predefined time-dependent flow rate, f(t), and the second predefined time-dependent flow rate, g(t), are each calculated to provide a resultant fuel property value for a combined purge gas effluent and blowdown gas stream that is constant or limited to a selected fuel property value range.

10. The process as claimed in claim 9, wherein the selected fuel property value range is ±5% of a mean value of the fuel property value during the blowdown step.

11. The process as claimed in claim 1,
wherein the fuel property value for the purge gas effluent is a higher heating value (HHV) or a lower heating value (LHV) for the purge gas effluent, and
wherein the fuel property value for the blowdown gas is a higher heating value (HHV) or a lower heating value (LHV) for the blowdown gas.

12. The process as claimed in claim 1,
wherein the fuel property value for the purge gas effluent is a Wobbe index (WI) value for the purge gas effluent, and
wherein the fuel property value for the blowdown gas is a Wobbe index (WI) value for the blowdown gas.

13. The process as claimed in claim 1,
wherein the fuel property value for the purge gas effluent is a property value relating to a stoichiometric oxygen requirement for complete combustion of the purge gas effluent; and
wherein the fuel property value for the blowdown gas is a property value relating to a stoichiometric oxygen requirement for complete combustion of the blowdown gas.

14. The process as claimed in claim 13,
wherein the stoichiometric oxygen requirement for complete combustion of the purge gas effluent is a combustion air requirement (CAR) for the purge gas effluent; and
wherein the stoichiometric oxygen requirement for complete combustion of the blowdown gas is a combustion air requirement (CAR) for the blowdown gas.

15. The process as claimed in claim 1, wherein the first predefined time-dependent flow rate is greater than zero at any time during the purge step and the second predefined time-dependent flow rate is greater than zero at any time during the blowdown step.

* * * * *